United States Patent Office 3,473,957
Patented Oct. 21, 1969

3,473,957
GAS-PERMEABLE FILMS AND COATINGS FROM NITROGEN - CONTAINING HIGH - MOLECULAR WEIGHT PRODUCTS
Herbert Porrmann, Konigshofen, Walter Seifried, Wiesbaden-Biebrich, and Hans-Werner Meyreis, Wiesbaden, Germany, assignors to Kalle Aktiengesellschaft, Wiesbaden-Biebrich, Germany, a corporation of Germany
No Drawing. Filed Apr. 1, 1965, Ser. No. 444,800
Claims priority, application Germany, Apr. 4, 1964, K 52,576
Int. Cl. B44d *1/44;* C09d *5/00*
U.S. Cl. 117—161                                    21 Claims

ABSTRACT OF THE DISCLOSURE

This invention relates to a gas-permeable, waterproof shaped article having pores which are in contact with each other, which article is useful as a substitute material for leather as well as for gas-permeable packaging films for foodstuffs, and comprises the polymer formed by reacting together at least one organic monomeric or polymeric isocyanate, having at least two isocyanate groups in the molecule directly linked to an aromatis nucleus, in the presence of at least one dialkyl formamide, the nitrogen atom of which is linked to at least one member selected from the group consisting of methyl and methylene groups, said polymer being characterized by the presence of isocyanurate rings.

---

The present invention relates to gas-permeable, waterproof films and coatings from nitrogen-containing, high-molecular weight products obtained by reacting a mixture of one or more organic isocyanate groups directly attached to an aromatic nucleus, in the presence of at least one dialkyl formamide, the nitrogen atom of which is linked to at least one methyl or methylene group, the reaction product exhibiting pores which are in contact with each other. The invention further relates to a process for the manufacture of the films and coatings.

It is known to produce cast films and coatings from high-molecular weight substances by pouring or coating such substances, in the form of solutions or dispersions, onto a carrier material or support where they dry and solidify to form a coherent film, which is drawn off if a film is to be manufactured. Subsequently, such coatings or films may be provided with pores, for example by mechanical means such as perforating. Owing to the limited mechanical possibilities of applying sufficiently fine perforating rolls, the properties of such materials show considerable disadvantages as regards the permeability to gas and simultaneous impermeability to water.

The present invention provides gas permeable, waterproof films and coatings from nitrogen-containing high-molecular weight products obtained by reacting a mixture of one or more organic isocyanates, the molecule of which has at least two isocyanate groups directly attached to an aromatic nucleus, in the presence of at least one dialkyl formamide, the nitrogen atom of which is linked to at least one methyl or methylene group, the reaction product exhibiting pores which are in contact with each other. The invention further provides a process for the manufacture of gas-permeable, waterproof films and coatings from nitrogen-containing high-molecular weight products, in which a mixture of one or more organic isocyanates, the molecule of which has at least two isocyanate groups directly attached to an aromatic nucleus, and at laest one dialkyl formamide, the nitrogen atom of which is linked to at least one methyl or methylene group, is applied to a support in the form of one of several thin layers and treated with water, if desired with the action of catalysts, during a period of time in which the quantity of isocyanate groups which are free and unreacted is between 0.1 and 4% by weight, based on the weight of the reaction mixture, while the viscosity is $3 \times 10^3$ to $1 \times 10^6$ cp., and in which the coating then may be drawn off for the purpose of manufacturing films.

Suitable organic isocyanates are all those in which at least two isocyanate groups are directly attached to an aromatic nucleus. The aromatic nucleus preferably is a benzene or naphthalene nucleus, but may also be a nucleus of a higher degree of condensation. The aromatic nucleus may be substituted and suitable examples of substituents are, in particular, electron-repelling substituents, such as alkyl groups, especially lowel alkyl groups, such as methyl, ethyl or butyl groups, but also, for example, alkoxy groups, especially lower alkoxy groups having 1 to 6 carbon atoms. The isocyanate groups may be attached to the same or to different aryl nuclei. In the latter case, the aryl nuclei may be linked together by one or more atoms or atomic groups, for example by an oxygen atom, a straight or branched chain alkylene group, generally containing not more than 20 and preferably not more than 10 carbon atoms, or a polyether or polyester group. The polyether group may have the structure $$-(RO)_m-$$

wherein R is a generally lower, straight or branched chain alkylene group, and $m$ is an integer generally not greater than 100. The polyester group may have the structures $$-(O-CO-R-CO-O-R')_n-$$

wherein R and R' are lower alkylene groups having up to 6 carbon atoms, for example, which may be branched, but may be arylene groups, and $n$ represents an integer determined in such a manner that the molecular weight of the polyester group which couples the isocyanato-aryl groups advantageously lies betweeen 600 and 2000. Compounds having polyether and polyester groups between the isocyanato-aryl groups are usually produced by addition of aryl di-isocyanates and polyols or polyesters having terminal hydroxyl groups, the corresponding groupings which couple the isocyanato-aryl groups having the formula $$-NH-CO-(RO)_m-CO-NH-$$

and $$-NH-CO-(O-CO-R-CO-O-R')_n-CO-NH-$$

whereine R, R', $m$, $n$, are as given above.

The isocyanates listed above may be monomolecular but also dimers and trimers, e.g. according to the following structural formulae

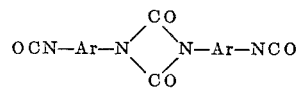

or

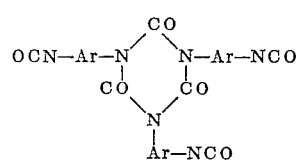

wherein Ar is an unsubstituted or substituted aryl group or one of the aforementioned groups of two aryl nuclei linked together by an oxygen atom or a longer chain. These latter polyfunctional isocyanates with oxygen-containing atomic groups between the isocyanate-aryl groups often have a molecular weight between 800 and 3000, preferably between 1000 and 2000, and may be obtained according to known processes from polyhydroxy compounds of polyethers or polyesters having terminal hydroxyl groups by reaction with an excess of low-molecular weight aromatic diisocyanates. Finally, such isocyanates in which two isocyanato-aryl groups are linked together by another aryl group (of the terphenyl type) or an aralkyl group may also be employed.

Suitable di- and polyisocyanates are the following: benzene-1,2-diisocyanate, benzene-1,4-diisocyanate, toluene-2,4-diisocyanate, naphthalene-1,5-diisocyanate, diphenylether-4,4'-diisocyanate, diphenylmethane - 4,4'-diisocyanate, triphenylmethane - 4,4',4''-triisocyanate, α,ω-diphenylhexane-4,4'-diisocyanate, adipic acid ethyleneglycol polyester toluene-2,4-diisocyanate of the formula

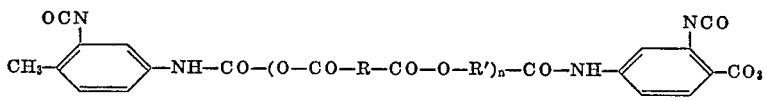

wherein R is an unbranched hexylene radical, R is an ethylene radical, and n is a mean value of approximately 3, a polypropylene ether diphenyl methane diisocyanate of the formula

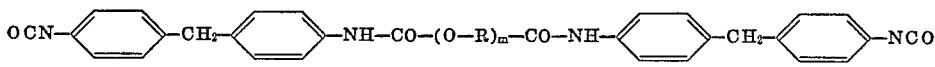

wherein R is an unbranched propylene radical and m is a mean value of approximately 30.

Suitable dialkyl formamides are all N-substituted formamides in which the two substituents attached to the nitrogen atom are alkyl or aralkyl groups, in which, in at least one of the two substituents, a methyl or methylene group is directly linked to the nitrogen atom, and which are liquid in the temperature range employed and readily soluble with the isocyanate compounds used. The number of carbon atoms in the substituents should not be greater than 10; dimethyl formamide is particularly suitable. Furthermore, for example, methylethyl-, methylpropyl-, diethyl-, methylbenzyl-, methyl-p-ethylbenzyl-, methyl-p-chlorobenzyl-, and methyl-p-methoxybenzyl-formamide, as well as compounds of the N-methylpyrrolidone type may be employed. The substituted formamides are preferably employed in the dry and freshly distilled state. Mixtures of the aforementioned di- or poly-isocyanates as well as of the dialkyl formamides may be used.

The quantity ratio of the aromatic di- or polyisocyanates and the dialkyl formamides may be widely varied. A rapid and smooth reaction is obtained if the molar ratio of diisocyanate to dialkyl formamide is about 1:2 to 1:6. If a greater dilution is advantageous for certain reasons, e.g. for the purpose of a more suitable viscosity and a better processibility of the solutions, the above molar ratio may be considerably exceeded, i.e. up to about 1:30. On the other hand, the molar ratio may even below 1:2 if it is of advantage for certain reasons, e.g. in order to prevent an excess of dialkyl formamide.

The reaction time is several hours to several days and may be considerably shortened by catalytic means, e.g. by employing catalysts and/or ultraviolet radiation.

Suitable catalysts are tertiary amines, such as trialkylamines, but pyridine may also be used, for example. Other suitable catalysts are those of the trialkylamino group in which the alkyl groups may be completely or partially replaced by cycloalkyl or aralkyl groups. Two alkyl groups in these tertiary amines may also be linked together to form a preferably 5- or 6-membered heterocyclic ring in which the amino-nitrogen atom is the heteroatom which applies, for example, to N-alkylpyrrolidins and N-alkylpiperidines. Quinoline and its lower alkyl substitution products or hexamethylene tetramine are also suitable as catalysts.

Other suitable catalysts are metal alcoholates, especially those prepared from metals of the 1st to the 4th principal group of the Periodic Table and alkanols containing 1 to 20, preferably 1 to 10, carbon atoms. Particularly suitable are the alcoholates of aluminum with lower alkanols, e.g. aluminum triethylate. Another suitable catalyst is tin-II-dioctoate. The catalysts of these groups should be soluble, at least partially, in the reaction mixture. Other examples of suitable catalysts are the hydroxides of the alkali and alkaline earth metals, which are generally almost completely suspended in the reaction mixture. Finally, potassium permanganate has also proved satisfactory as a catalyst. The catalyst usually is employed in amounts from 0.05 to 10%, based on the weight of the reaction mixture and, upon completion of the reaction, it may be washed out together with the excessive dialkyl formamide. When using potassium permanganate as a catalyst, good results are obtained using 0.005 to 0.05% by weight of added catalyst.

The solidification of the reaction mixture of organic diisocyanates and dialkyl foramamides can be accelerated not only by adding the aforementioned catalysts but also by ultraviolet radiation. The rays should not be so intense as to result in an extreme temperature rise of the reaction mixture. Sunlight or daylight also has an accelerating effect on the rate of reaction. The most suitable effect is obtained by violet and ultraviolet radiation.

A suitable acceleration of the reaction may be obtained by exposing the dialkyl formamide to ultraviolet radiation for about 15 minutes to several hours prior to mixing it with the isocyanate compounds. The time of reaction is especially shortened if the reaction is performed in the presence of a catalyst and under the influence of simultaneous ultraviolet radiation.

The use of ultraviolet light for accelerating the reaction is advantageously begun only a few minutes after the preparation of the reaction mixture, because slight yellowing of the reaction products caused by the radiation may thereby be prevented almost completely. Another way of accelerating the reaction rate is to incorporate dry air into the dialkyl formamide, prior to using it.

Exact investigations lead to the conclusion that, during polymerization, a trimerization primarily occurs with formation of isocyanuric acid rings. During further growth of the molecules, a system cross-linked in all directions and consisting of isocyanuric acid units linked to each other is formed, which forms a solid solution or a molecular bond with the dialkyl formamide. A direct chemical reaction of the diisocyanate with the dialkyl formamide is also possible but of no importance in the polymerization and becomes distinctly apparent only at higher temperatures.

The polycondensation products obtained in the process of the invention are insoluble in all commonly used organic and inorganic solvents, with the exception of trifluoroacetic acid, do not melt and decompose at temperatures above 285–300° C.

As supports may be used, preferably, any kind of porous support, e.g. woven or unwoven inorganic or organic materials such as felts, fleeces or papers. In these viscosity that it does not penetrate through the porous support or penetrates only so slowly that the solidification, which increases during the time of reaction, inhibits it from entirely flowing through. Such a regulation is not difficult since the porosity of the support still can be easily determined. A preliminary test also may show satisfactory results.

Coatings may be applied not only to the aforementioned porous supports but also to nonporous supports of any kind, such as films, foils, or sheets from natural materials such as wood, from modified natural substances, from synthetic plastics, such as thermoplastics, e.g. polyethylene, or polyacrylate, or thermosetting plastics, e.g. phenol/formaldehyde products, or from metals such as copper, iron, brass, in the form of tapes, wires, tubes, and filaments.

If the use of the porous supports does not result in satisfactory formation of pores on the contact area between the support and the coating, it is possible, during the subsequent manufacture of films, to take a thin layer from the surface of the contact area, e.g., by mechanical scraping.

The surface of the support onto which the reaction mixture is poured must, insofar as possible, be free from impurities and moisture and is, if necessary, preferably cleaned with the same dialkyl formamide which is used in the process. Due to the swelling effect of liquid dialkyl formamides on many high-molecular weight substances, the compound action between the coating and the support may be increased considerably during production of the coatings. The reaction mixtures may be applied to the support by pouring, brushing, dipping, knife-coating or in accordance with other known processes.

Coating, for example by pouring, is performed once or several times. Between the individual coating operations, the formation of pores is effected as described hereinafter. In this manner, layers may be produced up to several mm. in thickness, in special cases even more. All layers thus may have the same composition and can be produced under the same conditions.

It is also possible to prepare one or several layers from a mixture which differs in the composition of the reactants from the mixture used first or afterward. It is also possible in the case of the later coated layers to select the process conditions, such as temperature, time of solidification and treatment with water, in such a way that they differ from those of the layers coated first. Due to these possibilities of varying the multi-layer application method, it is possible, for example, to manufacture especially flexible coatings, which are more elastic on the outer surface than on the inner. Porous layers also may be produced according to this method, the pores on the outer surface having smaller diameters than those on the inner surface. The adhesive bond of the individual layers to each other is very good.

According to another method of application, it is possible to add to the last-coated layers certain quantities of difficultly wettable substances, such as ethylene/proplene copolymers, the water-repellent effect of the outer layer thus being increased. These quantities usually amount to not more than about 10% by weight, based on the weight of the reaction mixture; in special cases, however, greater quantities are also possible. Very suitable is, for example, an ethylene/proplene copolymer containing about 10–50 molar percent of propylene.

According to the process of the invention, it is possible to provide the coatings applied to the support with pores, i.e. the solidified coating material or the films possess pores which are in contact with each other. This is achieved by treating the reaction mixture, which is coated as a layer onto the support, with water during the completion of the reaction and before the end thereof. The time of beginning the treatment with water is decisive for the pore formation in general, also for the number of pores per unit area of the layer, and for the diameter of the pores.

The pore formation according to the process of the invention may be explained by the fact that the action of water on the free isocyanate groups enables them to react, with $CO_2$ being liberated. In the initial stages of the reaction, a great number of isocyanate groups is available but the viscosity of the layer has not yet attained such a value that the $CO_2$, which is eliminated by the action of water, results in the formation of permanent pores. In a stage of reaction which has proceeded too far, the viscosity of the layer is too high and the developed quantity of gas is insufficient so that only closed blisters or bubbles remain in the layer, which do not lead to pore formation.

The process of the present invention may be performed as follows: it is begun by mixing the reaction components described above, the composition and concentration thereof being as described, and, if desired, with the aid of a catalyst described above. Immediately or after some time when the viscosity of the mixture begins to slowly increase, it is coated onto a support. The thickness of the layer may vary widely, i.e. between about $10\mu$ and $1000\mu$, preferably between $20\mu$ and $100\mu$. Thicker and thinner layers, however, are also possible and suitable. The entire reaction mixture is then left as such, if desired under the influence of ultraviolet light, and, at a suitable moment, it is treated with water. The catalyzing action of ultraviolet light also may be begun earlier. The time of beginning the water treatment of the layer of reaction mixture depends first upon the number of free isocyanate groups which remain unreacted and second upon the viscosity of the reaction mixture. The number of the remaining free isocyanate groups preferably is between 0.1 and 4% by weight, based upon the weight of the reaction mixture. Especially good results are obtained with a range of 0.2 to 2% by weight.

The determination of the number of free isocyanate groups, i.e. the "isocyanate number" may be effected, for example, according to the method of G. Spielberger, which is described in Liebig's "Annalen der Chemie," 562 (1949), page 99. According to this method, the isocyanate is mixed with an excess of a secondary amine, e.g. diisopropylamine, and the unreacted excess is back titrated. At the beginning of the water treatment, the viscosity of the reaction mixture should be between $3 \times 10^3$ and $10^6$ cp. Especially good results are obtained with a range of $5 \times 10^3$ to $5 \times 10^5$ cp. Rapid and exact determination of the viscosities may be effected, for example, in a parallel test by means of a rotary viscosimeter. Viscosimeters of this kind are known in the art and are produced, for instance, by Haake-Berlin. According to this testing method, the torsional moment or the change of the torsional moment of the body of rotation, rotating in the liquid to be measured, is measured.

It has proved advantageous for the beginning of the action of water to be correlated with the reaction temperature of the diisocyanate/dialkyl formamide mixture and also with the layer thickness of the coating applied. Good results are obtained, in general, if the temperature of the reaction mixture, at the beginning of the action of water, is between 30 and 90° C., preferably 40 and 70° C., especially between 50 and 60° C. Reaction temperatures above 100° C. result in difficulties in the action of water. Furthermore, when operating at temperatures above 100° C., a side reaction is observed which increases correspondingly to the increasing temperature and, with a considerable generation of $CO_2$, results in low-molecular weight, unidentified products. It is therefore generally recommended not to raise the temperature above 100 or 110° C.

At these temperatures, the layer advantageously has a thickness between 20 and $200\mu$. The composition of the support has a certain effect on the formation of pores. In all cases, it is desirable to use a support of a certain porosity, the pore diameter and composition of which may vary widely. The size of the pores, however, must not exceed such values that the reaction mixture may flow completely through the support.

Water treatment may be effected by applying water to one or both sides; this can be done, for example, by immersion or washing in still or flowing water or, particularly advantageously, by spraying water onto the surface of the layer. A great excess of water may be employed. It is also sufficient, however, if the surface of the layer contacts the water, e.g. by treatment with vaporous water, if desired with the addition of air or another carrier gas, e.g. nitrogen. The temperature of the water may vary widely. It has proved advantageous to regulate the water temperature at the beginning of the water treatment in such a way that it equals or is as much as 30° C. higher than the temperature of the reaction mixture. The duration of the action of water is not critical, but it must continue until the desired degree of decomposition, with generation of $CO_2$, is obtained. This generally will be completed within a short time. Further action of water beyond this time may be advantageous in many cases if an unreacted reactant is to be washed out of the layer. The latter effect is also very suitable for the formation of pores, since the generally hygroscopic dialkyl formamide, especially in the case of dimethyl formamide, is extracted from the polymerizing base substance of the layer by treatment with water and the remaining voids are filled with $CO_2$ which is eliminated during the reaction of the isocyanate groups with water.

In contrast to the above, an underdosage of water caused, for example, by coating the layer with air containing water and of low water vapor concentration also may result in a controlled, i.e. a changed, or a too early termination of generation of $CO_2$. This results in a decrease of the number of pores per unit area and generally also in a decrease in the diameter of the pores. In special cases, it may be desirable.

For the manufacture of the coatings or films of the invention, it is particularly advantageous to use mixtures of low-molecular weight and high-molecular weight isocyanates. The ratio of the low-molecular weight to the high-molecular weight diisocyanates may influence the properties of the coatings obtained.

In the case where low-molecular weight diisocyanates are exclusively used, as described above, the coatings and films are harder whereas they are softer and more elastic in the case where high-molecular weight components are used, as described above, e.g. when they constitute at least 50% by weight of the total weight of diisocyanates. For the manufacture of coatings on elastic carriers such as fabrics or fleeces, the coatings preferably should be particularly elastic. Such a coating is obtained, for example, if a mixture consisting of 10–30% by weight of a low-molecular weight diisocyanate, such as diphenylmethane-4,4'-diisocyanate, and 70–90% by weight of a polypropylene ether diisocyanate of a molecular weight of 2500 is used together with dimethyl formamide.

The properties of the reaction mixture with regard to the processibility thereof, e.g. viscosity, as well as of the finished coating with regard to the mechanical properties and appearance thereof may be improved by adding pigments or fillers or other highly polymerized substances soluble in the aforementioned mixture, e.g. homo- or copolymers of polyvinyl chloride, polyvinyl acetate, polyacrylonitrile or other known substances, to the reaction mixture. According to this method, colored or especially elastic coatings may be obtained.

In some cases, it has been found advantageous to apply the reaction mixture in the presence of an additional inert solvent, e.g. tetrahydrofuran. This method is particularly suitable if the viscosity of the mixture is initially too high.

Furthermore, it has proved advantageous to adjust the temperature of the support during the coating operation so that it is equal to or as much as 30° C. higher than the temperature of the reaction mixture.

According to the process of the present invention, it is possible to manufacture in an advantageous manner porous coatings and films which, as regards their mechanical properties, fully meet the requirements of practice and industry. The diameter of the pores may be $100\mu$, and coatings of this kind are still sufficiently water-impermable. Preferably, coatings of 2–80$\mu$ pore diameter are obtained.

The materials of the present invention are very suitable as substitute materials for leather since, especially in this case, permeability to water vapor from inside to outside and impermeability to water from the outside are required. They are also suitable as porous films for packaging, e.g. for foodstuffs which usually are not hermetically sealed but must be waterproof on the outside.

The process of the present invention is simple, can be carried out in an uncomplicated manner, and always leads to excellently reproducible results. Particularly notable is the good yield since practically all reactants are a part of the product of the process.

The invention will be further illustrated by reference to the following specific examples:

EXAMPLE 1

3 g. of diphenylmethane-4,4'-diisocyanate are mixed at 40° C. with 2.5 g. of dry dimethyl formamide to form a solution and, with the addition of 0.5 g. of degassed carbon black and 0.02 g. of potassium permanganate, it is coated onto a dense fabric of polyethylene terephthalate fibers which has previously been heated to 60° C. The coating weight is about 190 g./m.$^2$ 30 seconds after the coating operation, the layer is immersed for at least 1.5 minutes into warm water at 55° C. and then dried for several minutes with hot air. A coated fabric is obtained having pores of 2–80$\mu$ diameter which are in contact with each other.

EXAMPLE 2

A mixture, at a temperature of 40° C., of 5 g. of a polyester diisocyanate having a molecular weight of 900, obtained by reaction of an adipic acid-ethylene glycol polyester with an excess of toluene-2,4'-diisocyanate, and 2 g. of dried and freshly distilled dimethyl formamide is coated, with the addition of about 0.1 g. of hexamethylene tetramine, in the form of a thin layer, onto a finely perforated but water-permeable polyamide film at a temperature of 60° C. and, after 30 seconds at the latest, a mist of very fine water drops is sprayed thereon. After an additional 5 minutes, the drops of water and dimethyl formamide produced on the layer may be wiped off. A wear-resistant compound film is obtained which is waterproof up to 0.1 atmosphere gauge pressure, but considerably permeable to air.

EXAMPLE 3

A mixture is prepared consisting of:

(a) 2.5 g. of diphenylmethane-4,4'-diisocyanate, dissolved in 2.5 g. of dimethyl formamide, and
(b) 13 g. of a polyether diisocyanate having a molecular weight of 2500 and obtained by reaction of polypropylene glycol with an excess of diphenylmethane-4,4'-diisocyanate and 2 g. of dimethyl formamide and 0.2 g. of triethylamine are added. The resulting mixture is coated, in the form of 4 separate applications, onto a fleece, each layer being exposed immediately after the coating operation to ultraviolet light for 1.5 minutes, then immersed for 30 seconds in a water bath at 60° C., and dried for 3–4 minutes with hot air. A porous, elastic material is obtained which is waterproof up to a water pressure of 0.2 atmosphere guage pressure, has a water-vapor permeability of about 0.6 mg./h. cm.$^2$, measured at 22° C. and 65% relative humidity, and, at a pressure differential of 250 mm. water column, has an air permeability of 4200 cm.³/dm.². 24 h. Such a material is very suitable when used as a leather substitute for upholstery, boot uppers, and the like.

It will be obvious to those skilled in the art that many modifications may be made within the scope of the present invention without departing from the spirit thereof, and the invention includes all such modifications.

What is claimed is:

1. A process for the preparation of a gas-permeable, waterproof shaped article htving pores which are in contact with each other, which comprises polymerizing a mixture comprising at least one organic isocyanate having at least two aromatically bonded isocyanate groups in the molecule to form a polymer having ieocyanurate rings in the presence of at least one dialkyl formamide, the nitrogen atom of which is linked to at least one member of the group consisting of a methyl and a methylene group, applying the reaction mixture to a support and treating it with water while it is in the fluid condition, said reaction mixture containing free unreacted isocyanate groups in the range of about 0.1 to 4 percent by weight, based upon the weight of the reaction mixture, and said reaction mixture having a viscosity in the range of about $3 \times 10^3$ to $1 \times 10^6$ centipoises.

2. A process according to claim 1 in which the isocyanate has a molecular weight between 800 and 3000 and is obtained by the reaction of a polyester from adipic acid and ethylene glycol, with terminal hydroxyl groups, and an excess of toluene-2,4-diisocyanate.

3. A process according to claim 1 in which the isocyanate has a molecular weight between 800 and 3000 and is a polyether diisocyanate obtained from polypropylene glycol and an excess of diphenylmethane-4,4'-diisocyanate.

4. A process according to claim 1 in which the reaction mixture is applied to the support in the form of a layer having a thickness in the range of about 20 to 200μ.

5. A process according to claim 1 in which the temperature of the reaction mixture is maintained in the range of about 30 to 90° C. during the reaction.

6. A process according to claim 1 in which the water treatment is effected by immersing the supported reaction mixture in a water bath.

7. A process according to claim 1 in which the temperature of the water at the beginning of the water treatment is at least as high as the temperature of the reaction mixture.

8. A process according to claim 1 in which the temperature of the support at the beginning of the operation of applying the reaction mixture thereto is in the range of about equal, to 30° C. higher than the temperature of the reaction mixture.

9. A process according to claim 1 in which the water treatment is effected by spraying the supported reaction mixture with water.

10. A process according to claim 1 in which the support is a fabric formed from synthetic fibers.

11. A process according to claim 1 in which the isocyanate is diphenylmethane-4,4'-diisocyanate.

12. A process according to claim 1 in which the dialkyl formamide is dimethyl formamide.

13. A process according to claim 1 in which the reaction is effected in the presence of a catalyst selected from the group consisting of triethylamine, potassium permanganate, and hexamethylene tetramine.

14. A process according to claim 1 in which the shaped article is a film and comprising the additional step of drawing solidified reaction mixture from the support.

15. A gas-permeable, waterproof polyisocyanurate shaped article having pores which are in contact with each other comprising the polymerization product of at least one organic isocyanate having at least two isocyanate groups in the molecule directly linked to an aromatic nucleus to form a polymer having isocyanurate rings, said product being polymerized in the presence of at least one dialkyl formamide, the nitrogen atom of which is linked to at least one member selected from the group consisting of methyl and methylene groups.

16. A shaped article according to claim 15 in which the isocyanate has a molecular weight between 800 and 3000 and is obtained by the reaction of a polyester from adipic acid and ethylene glycol, with terminal hydroxyl groups, and an excess of toluene-2,4-diisocyanate.

17. A shaped article according to claim 15 in which the isocyanate has a molecular weight between 800 and 3000 and is a polyether diisocyanate obtained from polypropylene glycol and an excess of diphenylmethane-4,4'-diisocyanate.

18. A shaped article according to claim 15 in which the shaped article is a film.

19. A shaped article according to claim 15 in which the shaped article is a coating.

20. A shaped article according to claim 15 in which the isocyanate is diphenylmethane-4,4'-diisocyanate.

21. A shaped article according to claim 15 in which the dialkyl formamide is dimethyl formamide.

References Cited

UNITED STATES PATENTS

| | | | |
|---|---|---|---|
| 2,965,614 | 12/1960 | Shashoua | 260—77.5 |
| 2,978,449 | 4/1961 | France et al. | 260—248 |
| 3,000,757 | 9/1961 | Johnston et al. | 117—63 |
| 3,100,721 | 9/1963 | Holden | 117—135.5 |
| 3,108,100 | 10/1963 | Tate et al. | 260—248 |

FOREIGN PATENTS

| | | |
|---|---|---|
| 1,105,155 | 12/1961 | Germany. |
| 1,112,041 | 2/1962 | Germany. |

OTHER REFERENCES

Beachell et al.—Polymer Letters, vol. 1, 25–26 (1963).

Weiner—Journal of Organic Chemistry, vol. 25, 2245–6 (1960).

E. I. du Pont de Nemours & Co. Product Information: Dimethyl Formamide (1949) 1–9.

DONALD E. CZAJA, Primary Examiner

H. S. COCKERAM, Assistant Examiner

U.S. Cl. X.R.

99—171; 117—63, 135.5; 260—2.5, 75, 77.5; 264—54

PO-1050
(5/69)

UNITED STATES PATENT OFFICE
CERTIFICATE OF CORRECTION

Patent No. 3,473,957          Dated October 21, 1969

Inventor(s) Herbert Porrmann, Walter Seifried, and Hans-Werner Meyreis

It is certified that error appears in the above-identified patent and that said Letters Patent are hereby corrected as shown below:

Column 1, line 25, "is" should read - - - ic - - -.

Column 2, line 15, "lowel" should read - - - lower - - -.

Column 3, "$CO_3$", at the end of the first formula should read - - - $CH_3$ - - -.

Column 4, line 36, "foramamides" should read - - - formamides - - -.

Column 4, last line, after "In these", - - - cases the reaction mixture should be applied at such a - - -, should be inserted.

Column 8, line 9, "mable" should read - - - meable - - -.

Column 9, line 2 of claim 1, "htving" should read - - - having - - -.

Column 9, line 6 of claim 1, "ieocyanurate" should read - - - isocyanurate - - -.

SIGNED AND
SEALED

JUL 28 1970

(SEAL)
Attest:

Edward M. Fletcher, Jr.
Attesting Officer

WILLIAM E. SCHUYLER, JR.
Commissioner of Patents